United States Patent
Bracamontes

(10) Patent No.: US 8,533,439 B2
(45) Date of Patent: Sep. 10, 2013

(54) ELASTIC SHARED RAM ARRAY INCLUDING CONTIGUOUS INSTRUCTION AND DATA PORTIONS DISTINCT FROM EACH OTHER

(75) Inventor: Rocendo Bracamontes, Ellicott City, MD (US)

(73) Assignee: Atmel Corporation, San Jose, CA (US)

( * ) Notice: Subject to any disclaimer, the term of this patent is extended or adjusted under 35 U.S.C. 154(b) by 234 days.

(21) Appl. No.: 11/268,008

(22) Filed: Nov. 7, 2005

(65) Prior Publication Data
US 2007/0106884 A1    May 10, 2007

(51) Int. Cl.
G06F 9/00    (2006.01)
(52) U.S. Cl.
USPC .......................................................... 712/227
(58) Field of Classification Search
USPC .......................................................... 712/248
See application file for complete search history.

(56) References Cited

U.S. PATENT DOCUMENTS

| | | | |
|---|---|---|---|
| 3,638,185 A * | 1/1972 | Dell et al. | 714/2 |
| 4,089,059 A * | 5/1978 | Miller et al. | 708/130 |
| 5,425,131 A | 6/1995 | Basehore | 706/8 |
| 5,535,410 A * | 7/1996 | Watanabe et al. | 712/20 |
| 5,737,548 A | 4/1998 | Yach et al. | 713/600 |
| 5,809,327 A | 9/1998 | Wollan et al. | 712/33 |
| 5,854,939 A | 12/1998 | Wollan et al. | 712/41 |
| 5,860,021 A | 1/1999 | Klingman | 712/32 |
| 5,894,549 A | 4/1999 | Cheng | 714/42 |
| 6,049,672 A * | 4/2000 | Shiell et al. | 717/168 |
| 6,321,380 B1 * | 11/2001 | Derrick et al. | 717/168 |
| 2004/0177211 A1 | 9/2004 | Boles et al. | 711/5 |
| 2005/0138330 A1 | 6/2005 | Owens et al. | 712/209 |
| 2009/0113175 A1 * | 4/2009 | Wong et al. | 712/36 |

FOREIGN PATENT DOCUMENTS

WO    WO-2007056234 A2    5/2007
WO    WO-2007056234 A3    5/2007

* cited by examiner

*Primary Examiner* — Keith Vicary
(74) *Attorney, Agent, or Firm* — Fish & Richardson P.C.

(57) ABSTRACT

A microcontroller, system and method are provided. In one implementation, a microcontroller is provided that includes a first memory operable to store instructions for normal operational use of the microcontroller, a second memory operable to store patch code instructions during debugging of the instructions within the first memory, and a central processing unit (CPU) operable to fetch instructions from the first memory and the patch code instructions from the second memory. The second memory is further operable to store the instructions for normal operational use of the microcontroller or data after the debugging of the instructions within the first memory is completed.

21 Claims, 7 Drawing Sheets

ELASTIC SHARED RAM ARRAY INCLUDING CONTIGUOUS INSTRUCTION AND DATA PORTIONS DISTINCT FROM EACH OTHER

FIELD OF THE INVENTION

The present invention relates generally to digital circuits, and more particularly to memory systems in a microcontroller.

BACKGROUND OF THE INVENTION

A microcontroller is generally a computer-on-a-chip optimized to control electronic devices. A microcontroller typically includes a central processing unit (CPU), a random access memory (RAM), a read-only memory (ROM), input/output (I/O) ports, and timers. Unlike a general-purpose computer, which also includes similar components, a microcontroller is usually designed to implement a very specific task— e.g., to control a particular system. As a result, the components of a microcontroller can be simplified and reduced, which cuts down on production costs. Several architectures exist for microcontrollers. Two architectures in particular are the Harvard architecture and the Von Neumann architecture.

FIG. 1 shows a microcontroller 100 in accordance with the Harvard architecture. Microcontroller 100 includes a CPU 102, a program memory 104, a data memory 106, an instruction bus 108, and a data bus 110. Program memory 104 stores a set of instructions to be executed by CPU 102. Data memory 108 stores the data required for the execution of the instructions, and also stores result data. The term Harvard architecture originally referred to computer architectures that used physically separate storage and signal pathways for instructions and data. Specifically, the term originated from the Harvard Mark relay-based computer, which stored instructions (e.g., computer program instruction code) on punched tape and stored data in relay latches. Accordingly, as shown in FIG. 1, program memory 104 is physically separate from data memory 106 and instruction bus 108 is physically separate from data bus 110. In a microcontroller in accordance with the Harvard architecture, the CPU (e.g., CPU 102) can read (or fetch) an instruction and read/write data at the same time. Consequently, such a microcontroller is generally fast as the microcontroller can fetch a next instruction at the same time a current instruction is being executed.

In contrast to the Harvard architecture, FIG. 2 shows a microcontroller 200 in accordance with the Von Neumann architecture. The Von Neumann architecture is a model for a computing machine that uses a single structure (memory) to store both the set of instructions to be executed as well as the data required for (and generated from) execution of the set of instructions. Accordingly, microcontroller 200 includes a CPU 202, a combined program and data memory 204, and a single instruction/data bus 206. In a microcontroller with a Von Neumann architecture, the CPU can either fetch an instruction or read/write data to the memory, however, both cannot occur at the same time since the instructions and data use the same signal pathway (or bus) and memory. By treating the instructions in the same way as the data, a microcontroller in accordance with the Von Neumann architecture (e.g., microcontroller 200) can easily change the stored instructions (e.g., to modify or increment an address portion of the stored instructions). In other words, the microcontroller is re-programmable.

Typically, in application-specific integrated circuits (ASICs) that use an embedded microcontroller having either only a program memory and a data memory (e.g., in accordance with the Harvard architecture) or only a single combined program and data memory (e.g., in accordance with the Von Neumann architecture), modifying the instructions (e.g., for testing and debugging purposes) within the program memory or the combined program and data memory (each of which is typically a read-only memory (ROM)) is generally a difficult task. For example, if a programmer desires to modify the instructions within the ROM memory, the ASIC including the embedded microcontroller must typically be re-spun in order to change the instructions placed in the ROM memory. Consequently, the design cycle and time to market of the ASIC are affected due to the turn around time needed to re-spin the ASIC. Also, it is generally expensive to re-spin an ASIC, especially when state of the art masks are used in the re-spin process.

A conventional technique to address the problem of modifying instructions within a ROM memory includes providing an extra RAM memory with external access within a microcontroller, such as microcontroller 300 shown in FIG. 3. Microcontroller 300 includes a CPU 302, a program memory 304, a data memory 306, an instruction bus 310 and a data bus 312. Microcontroller 300 further includes an extra RAM memory 308 in communication with CPU 302 through instruction bus 310. Extra RAM memory 308 is typically used only for debugging purposes and can be re-programmed (through the external access) and be used as a complement of the existing program memory 304. One disadvantage of including an extra RAM memory within a microcontroller design is that the extra RAM memory generally takes up valuable die space or silicon real estate. Once instruction code within a ROM has been finalized, an ASIC typically goes into production having the extra RAM memory still occupying the (expensive) silicon real estate, and because the extra RAM memory is generally only used for testing and debugging purposes, the extra RAM memory is typically goes unused during normal operation of the ASIC. As production quantities of ASICs increase, cumulatively, the extra area taken up by the extra RAM memory generally become more expensive relative to using methods of re-spinning new ASICs to debug and test ASICs.

Accordingly, what is needed is an improved technique that permits testing for the correct operation instructions within a ROM memory of a microcontroller that does not require a re-spin of an ASIC to modify the instructions and which is cost effective in terms of use of silicon real estate. The present invention addresses such a need.

BRIEF SUMMARY OF THE INVENTION

In general, in one aspect, this specification describes a microcontroller. The microcontroller includes a first memory operable to store instructions for normal operational use of the microcontroller, a second memory operable to store patch code instructions during debugging of the instructions within the first memory, and a central processing unit (CPU) operable to fetch instructions from the first memory and the patch code instructions from the second memory. The second memory is further operable to store the instructions for normal operational use of the microcontroller or data after the debugging of the instructions within the first memory is completed.

Particular implementations can include one or more of the following features. The first memory can be a read-only memory, and the second memory can be a bi-dimensional random access memory (RAM) array. The bi-dimensional random access memory (RAM) array can comprise a plurality of random access memories (RAMs) of a pre-determined size. The pre-determined size can be one of 8-bits, 16-bits, 32-bits, 64-bits, or 128-bits. The second memory can be configured according to one of the following storage configurations after the debugging of the instructions within the first memory is completed: to only store the data, to only store the instructions for normal operational use of the microcontroller, or to store both the data and the instructions for normal operational use of the microcontroller. The microcontroller can further include a boundary register operable to designate an instruction portion of the second memory for storing instructions and designate a data portion of the second memory for storing data. The microcontroller can further include a third memory operable to store data required by the CPU to execute the instructions in the first memory. The microcontroller can be a Harvard 8-bit data, 16-bit instruction microcontroller.

In general, in another aspect this specification describes a method for executing instructions within a microcontroller. The method includes storing instructions for normal operational use of the microcontroller in a first memory of the microcontroller, and storing patch code instructions in a second memory of the microcontroller. The patch code instructions are used during debugging of the instructions stored in the first memory. The method further includes fetching instructions from the first memory or the patch code instructions from the second memory during the debugging of the instructions within the first memory, and configuring the second memory to store the instructions for normal operational use of the microcontroller or data after the debugging of the instructions within the first memory is completed.

Particular implementations can include one or more of the following features. Storing instructions for normal operational use of the microcontroller in a first memory can include storing the instructions for normal operational use of the microcontroller in a read-only memory. Storing patch code instructions in a second memory can include storing the patch code instructions in a bi-dimensional random access memory (RAM) array. Configuring the second memory can include configuring the second memory according to one of the following storage configurations after the debugging of the instructions within the first memory is completed: to only store the data, to only store the instructions for normal operational use of the microcontroller, or to store both the data and the instructions for normal operational use of the microcontroller. The method can further include designating an instruction portion of the second memory for storing instructions and designating a data portion of the second memory for storing data. The method can further include storing, in a third memory, data required by the CPU to execute the instructions stored in the first memory.

In general, in another aspect this specification describes a system for performing a specific task. The system includes a microcontroller operable to execute instructions associated with the task. The microcontroller includes a first memory operable to store the instructions associated with the task; a second memory operable to store patch code instructions during debugging of the instructions associated with the task; and a central processing unit (CPU) operable to fetch the instructions from the first memory and the patch code instructions from the second memory. The second memory is operable to store the instructions associated with the task or data for performing the task after the debugging of the instructions within the first memory is completed.

Particular implementations can include one or more of the following features. The system can be associated with one of a data storage system, wireless system, or a computer system.

Implementations may provide one or more of the following advantages. During test and evaluation of a microcontroller, evaluation patch code can be loaded into the elastic shared RAM array which permits the testing, evaluation, and debug process of the microcontroller (and associated ASIC) to continue without the necessity of waiting for new ROM masks and wafers to be created and processed through a fab. Accordingly, a programmer can load and execute new code from the elastic shared RAM array and, in addition, a portion of the elastic shared RAM array can be used to store data. Depending upon the configuration and the size of individual RAM memories within the elastic shared RAM array, once a microcontroller has been finalized for production, the programmer can set the amount of memory within the elastic shared RAM array to be used to store instructions and data, thus maximizing the usage of memory and eliminating the waste of expensive silicon real estate.

The details of one or more implementations are set forth in the accompanying drawings and the description below. Other features and advantages will be apparent from the description and drawings, and from the claims.

BRIEF DESCRIPTION OF SEVERAL VIEWS OF THE DRAWINGS

Like reference symbols in the various drawings indicate like elements.

DETAILED DESCRIPTION OF THE INVENTION

The present invention relates generally to digital circuits, and more particularly to memory systems in a microcontroller. The following description is presented to enable one of ordinary skill in the art to make and use the invention and is provided in the context of a patent application and its requirements. Various modifications to the preferred implementations and the generic principles and feature described herein will be readily apparent to those skilled in the art. Thus, the present invention is not intended to be limited to the implementations shown but is to be accorded the widest scope consistent with the principles and features described herein.

Figure 1:
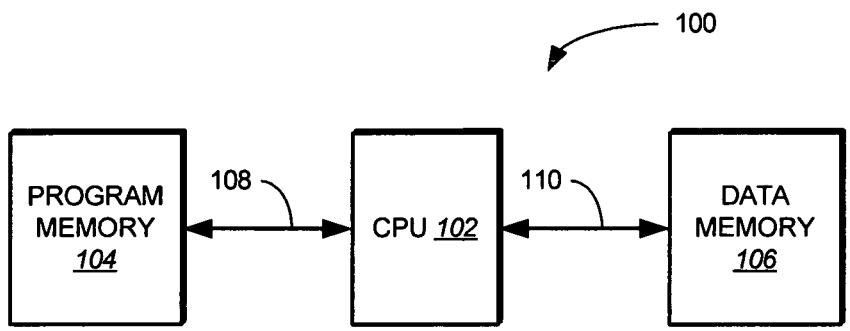
FIG. 1 is a block diagram of a conventional microcontroller in accordance with the Harvard architecture.
Figure 2:
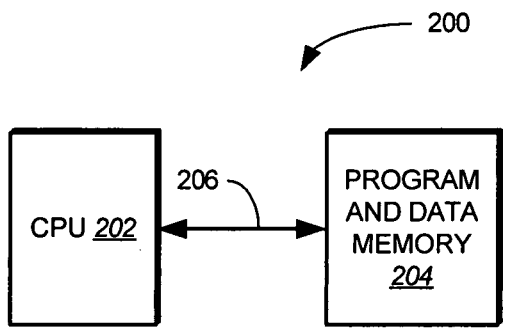
FIG. 2 is a block diagram of a conventional microcontroller in accordance with the Von Neumann architecture.
Figure 3:
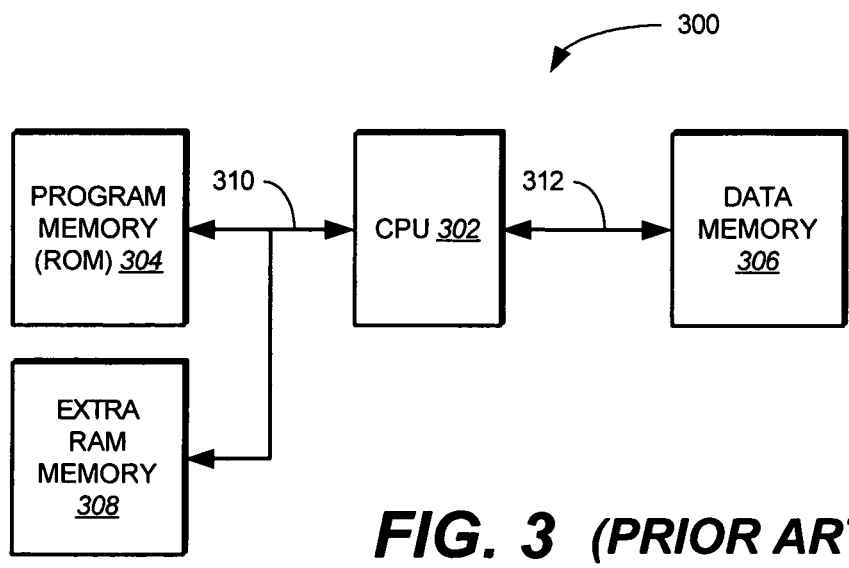
FIG. 3 is a block diagram of a conventional microcontroller including an extra RAM memory.
Figure 4:
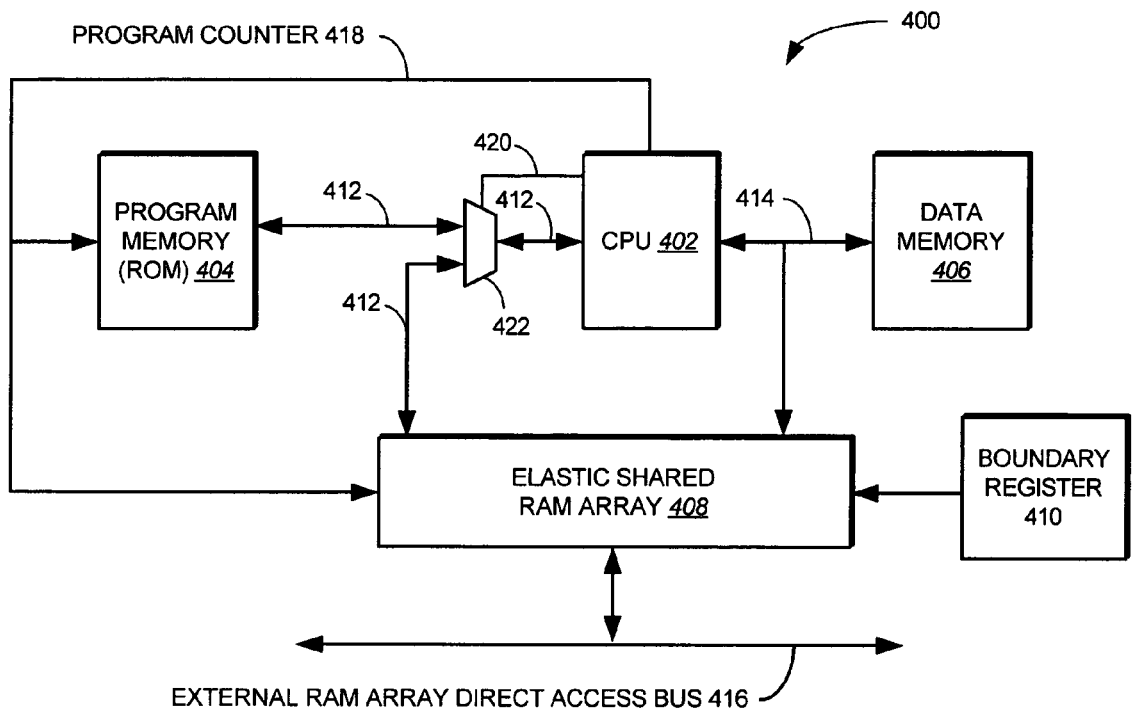
FIG. 4 is a block diagram of a microcontroller including an elastic shared RAM array in accordance with one implementation of the invention.

FIG. 4 shows a block diagram of a microcontroller 400. In one implementation, microcontroller 400 is a ROM based Harvard 8-bit data, 16-bit instruction microcontroller. Microcontroller 400 includes a CPU 402, a program memory 404, a data memory 406, an elastic shared RAM array 408, and a boundary register 410. CPU 402 is in communication with program memory 404 through an instruction bus 412. CPU 402 is also in communication with data memory 406 through a data bus 414. Accordingly, in operation, CPU 402 is operable to simultaneously fetch instructions from program memory 404 and read/write data from/to data memory 406.

CPU 402 is further in communication with elastic shared RAM array 408 though instruction bus 412 and data bus 414. In one implementation, elastic shared RAM array 408 includes an array of multiple RAM memories (not shown) for storing instructions and/or data, as discussed in greater detail below in connection with FIG. 5. Accordingly, for testing purposes, a programmer can load instructions into elastic shared RAM array 408 through an external RAM array direct access bus 416. Thus, like conventional microcontrollers including an extra RAM memory, a programmer can load test code (or test instructions) into elastic shared RAM array 408 to debug and patch code within program memory 404. However, unlike in conventional microcontrollers, elastic shared RAM array 408 is also operable to store data and, accordingly, CPU 402 is operable to read/write data from/to elastic shared RAM array 408. In addition, once testing of an ASIC is completed, a programmer can program elastic shared RAM array 408 to be used as extra memory to hold instructions and/or data during normal operational use of the ASIC that includes microcontroller 400. Thus, the silicon real estate used by elastic shared RAM array 408 does not go unused or to waste during normal operation of the ASIC.

In one implementation, CPU 402 increments an address from which a next instruction will be fetched through a program counter 418. Also, in one implementation, CPU 402 selects an instruction from either program memory 404 or elastic shared RAM array 408 by providing a control signal 420 to a multiplexer 422. Microcontroller 400 can further include one or more multiplexers (not shown) along data bus 414 that are controlled by CPU 402 for reading or writing data from/to data memory 406 or elastic shared RAM array 408. In one implementation, a programmer sets the size and configuration of the data portion and instruction portion (e.g., how much of elastic shared RAM array 408 is dedicated to providing additional storage for instructions in relation to how much of elastic shared RAM array 408 is dedicated to providing additional storage for data) of elastic shared RAM array 408 through boundary register 410, as discussed in greater detail below.

Figure 5:
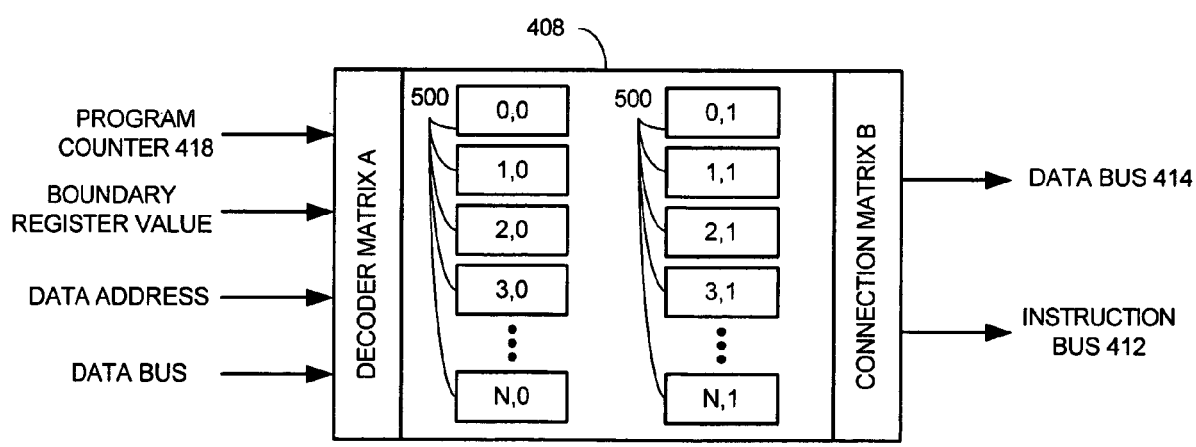
FIG. 5 is a block diagram of the elastic shared RAM array of FIG. 4 in accordance with one implementation of the invention.

FIG. 5 illustrates one implementation of elastic shard RAM array 408. As shown, elastic RAM array 408 includes a bi-dimensional array of RAM memories 500. In one implementation, RAM memories 500 are configured to be addressed according to blocks of single bytes (e.g., 8-bit as data memory) or words (e.g., 16-bit instructions). Other configurations are possible, e.g., 16, 32, 64 bit data memory or instructions and so on. Accordingly, each RAM memory 500 can be addressed by a data address or instruction address received by an address decoder (e.g., decoder matrix A) according to an address value (e.g., [0,0], [0,1] . . . [N,0], [0,1], [1,1] . . . [N,1]). Elastic shared RAM array 408 further includes a bus (or connection matrix B) for providing data to data bus 414 and instructions to instruction bus 412 from corresponding RAM memories 500.

In general, the architecture of microcontroller 400 (FIG. 4) permits a programmer to use all or a portion of elastic shared RAM memory 408 to store instructions or data. In one implementation, the boundary between the instruction portion and data portion of elastic shared RAM 408 is determined by a boundary register value contained within boundary register 410. The boundary register value can be fixed by the programmer once the testing of an ASIC that contains microcontroller 400 is complete. However, during testing of the ASIC, the boundary register can be programmed to contain different values as required to test operation of the ASIC. In one implementation, the boundary value can further be changed during normal operation of the ASIC if desired by an end-user (or customer) of the ASIC.

Figure 6:
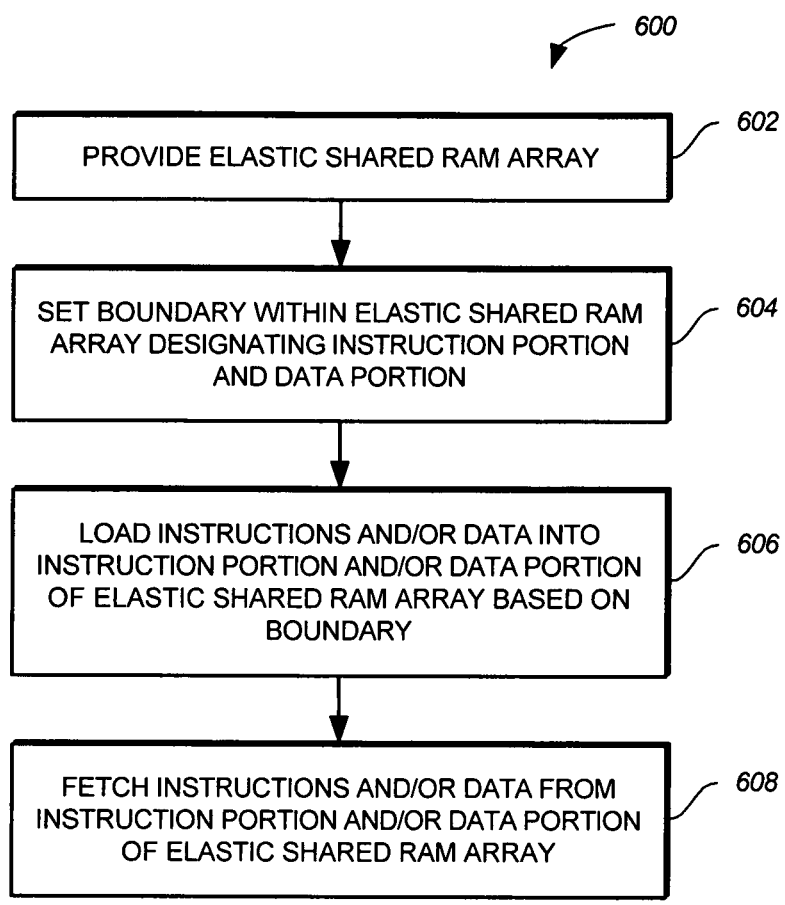
FIG. 6 illustrates a method for using the elastic shared RAM array of FIG. 4 in accordance with one implementation of the invention.

FIG. 6 shows a method 600 of operation of a microcontroller (e.g., microcontroller 400) implementing an elastic shared RAM array (e.g., elastic shared RAM array 408) in accordance with one implementation of the invention. An elastic shared RAM array is provided (step 602). The elastic shared RAM array includes multiple RAM memories for storing instructions or data. In one implementation, each RAM memory is (8) bits in size. Other sizes for the individual RAM memories can be used (e.g., 16, 32, 62, 128 bits and so on). A boundary is set within the elastic shared RAM array that determines (or designates) an instruction portion for storing instructions and a data portion for storing data (step 604). In one implementation, the boundary determines the RAM memories that are dedicated to storing instructions (e.g., the instruction portion of the elastic shared RAM array). The boundary also determines the RAM memories that are dedicated to storing data (e.g., the data portion of the elastic shared RAM array). In one implementation, the boundary in accordance with a boundary register value is stored within a boundary register (e.g., boundary register 410).

Instructions and/or data are respectively loaded into the instruction or data portion of the elastic shared RAM array based on the boundary (step 606). In general, the elastic shared RAM array can be configured (3) different ways—full usage as a data memory, full usage as a program memory, and a shared usage in which one portion of the elastic shared RAM array stores instructions and another portion stores data. Accordingly, data and/or instructions can be loaded into the RAM memories of the elastic shared RAM array based on the configuration, e.g., as determined by a programmer. Instructions are fetched and data is read/written from/to the instruction or data portions of the elastic shared RAM array by a CPU (e.g., CPU 402) (step 608).

As discussed above, the elastic shared RAM array can be configured (3) different ways. The elastic shared RAM array can be configured to only store data (e.g., full usage as data memory), to store only instructions (e.g., full usage as program memory), or to store both data and instructions (e.g., shared usage as data memory and program memory). A discussion of each of these configurations will now be discussed.

Full Usage as Data Memory

Figure 7:
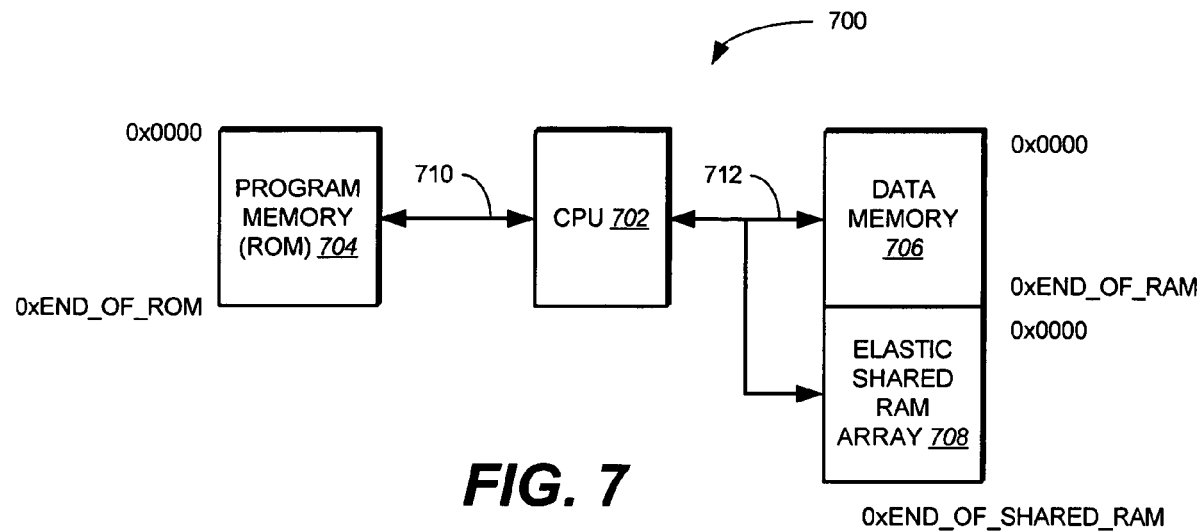
FIG. 7 is a block diagram of a microcontroller including an elastic shared RAM array in accordance with one implementation of the invention.

Referring to FIG. 7, a microcontroller 700 is shown including a CPU 702, a program memory 704, a data memory 706, and an elastic shared RAM array 708. In the example of FIG. 7, elastic shared RAM array 708 is configured to only store data (e.g., during normal use of an ASIC that incorporates microcontroller 700 or during testing of code within program memory 704). Accordingly, each of data memory 706 and elastic shared RAM array 708 are in communication with CPU 702 through a data bus 712. CPU 702 is also in communication with program memory 704 through an instruction bus 710.

In one implementation, in order to use elastic shared RAM array 708 as an extended data memory to store data, the program counter (e.g., program counter 418 of FIG. 4), should remain in the range of available addresses within program memory 704—e.g., within the range of 0×0000 to 0×END_OF_ROM. Thus, in this implementation, the boundary register (e.g., boundary register 410) can include the value 0×0000 indicating that elastic shared RAM array 708 is to be used fully as an extended data memory to store only data. CPU 702 can, therefore, read/write data from/to data memory 706 as well as elastic shared RAM array 708. In the example shown in FIG. 7, CPU 702 can read/write data from/to addresses of 0×0000 to 0×END_OF_RAM (e.g., the available addresses of data memory 706) and 0×0000 to 0×END_OF_SHARED_RAM (e.g., the available addresses of elastic shared RAM array 708).

Figure 8:
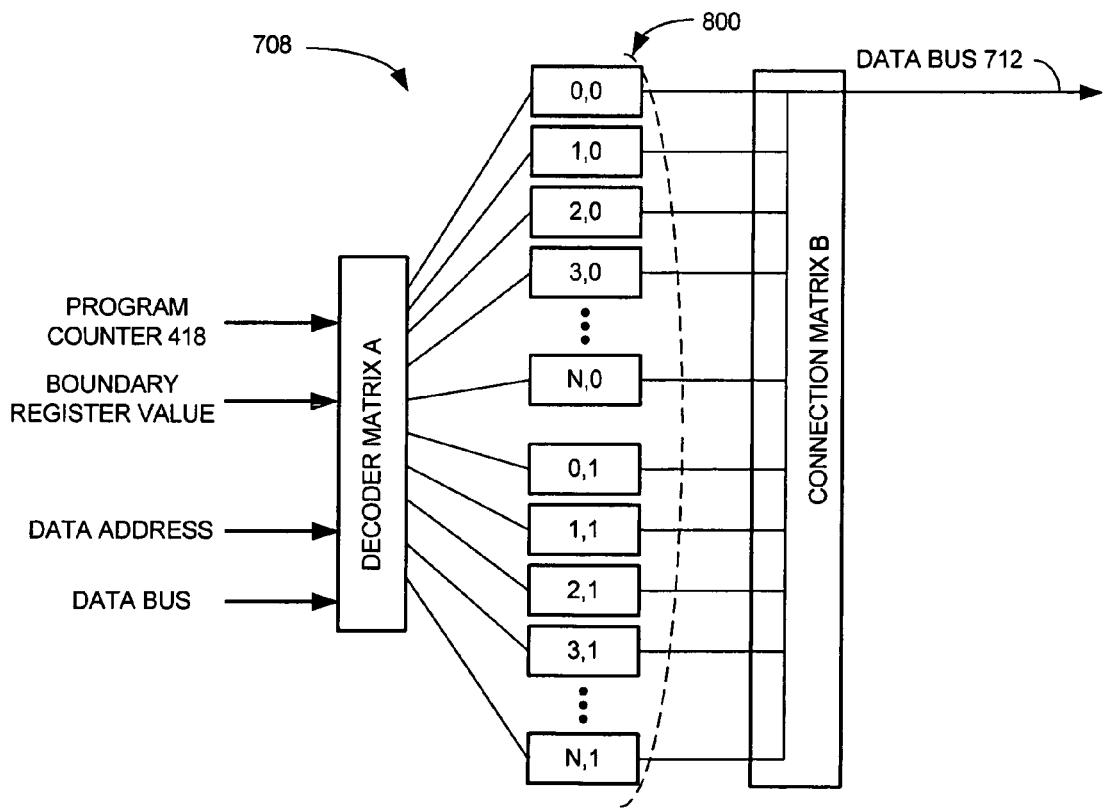
FIG. 8 is a block diagram of the elastic shared RAM array of FIG. 7 in accordance with one implementation of the invention.

FIG. 8 illustrates further details of elastic shared RAM array 708 according to one implementation. In this implementation, each of the individual RAM memories 800 is 8-bits wide and is configured for data access. Accordingly, decoder matrix A and connection matrix B selects proper control lines to generate 8-bit data outputs along data bus 712. The individual RAM memories 800 can have a different size depending upon application requirements. For example, assuming that elastic shared RAM array 708 is (64) bytes in size, then the total additional data bytes available within elastic shared RAM array 708 (in one implementation) is given by the following equation:

$$\text{Additional\_data\_RAM} = (2*(N+1))*64, \quad (\text{e.q. 1})$$

where N represents the number of rows in the bi-dimensional array of elastic shared RAM array 708.

Full Usage as Program Memory

Figure 9:
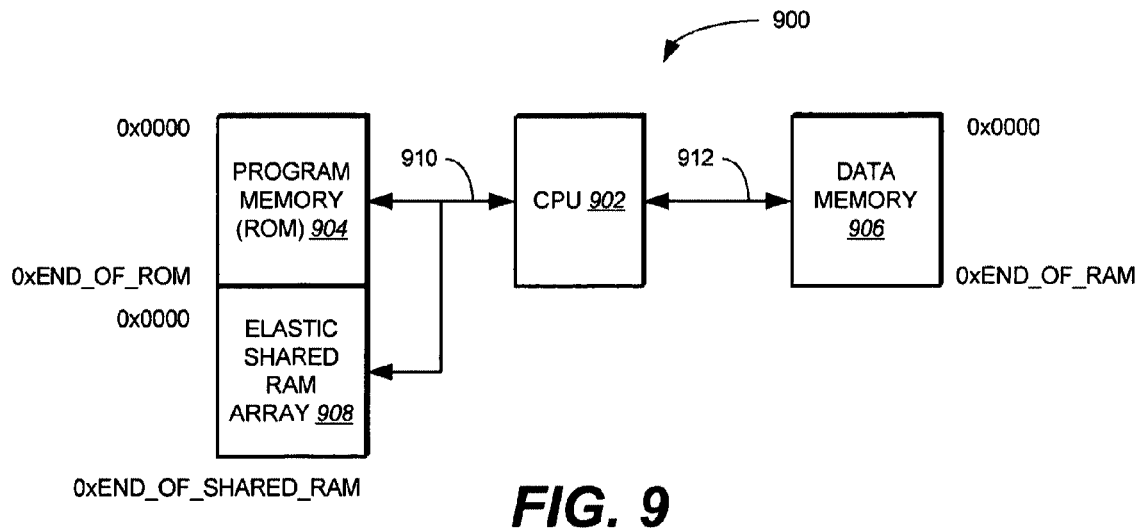
FIG. 9 is a block diagram of a microcontroller including an elastic shared RAM array in accordance with one implementation of the invention.

Referring to FIG. 9, a microcontroller 900 is shown including a CPU 902, a program memory 904, a data memory 906, and an elastic shared RAM array 908. In the example of FIG. 9, elastic shared RAM array 908 is configured to only store instructions (e.g., during normal use of an ASIC that incorporates microcontroller 900 or during testing of code within program memory 904). Each of program memory 904 and elastic shared RAM array 908 is, therefore, in communication with CPU 902 through an instruction bus 910. CPU 902 is also in communication with data memory 906 through a data bus 912.

In one implementation, in order to use elastic shared RAM array 908 as an extended program memory to only store instructions, the program counter (e.g., program counter 418 of FIG. 4), can designate the full range of available addresses within program memory 904 as well as the full range of available addresses within elastic shared RAM array 908 from which instructions will be fetched. In the implementation shown in FIG. 9, CPU 902 can, therefore, fetch instructions from addresses within the range of 0×0000 to 0×END_OF_ROM (e.g., the available addresses of program memory 904) and 0×0000 to 0×END_OF_SHARED_RAM (e.g., the available addresses of elastic shared RAM array 908). Thus, in this implementation, the boundary register (e.g., boundary register 410) can include the value 0×END_OF_SHARED_RAM indicating that elastic shared RAM array 908 is to be used fully as an extended program memory to store only instructions.

Figure 10:
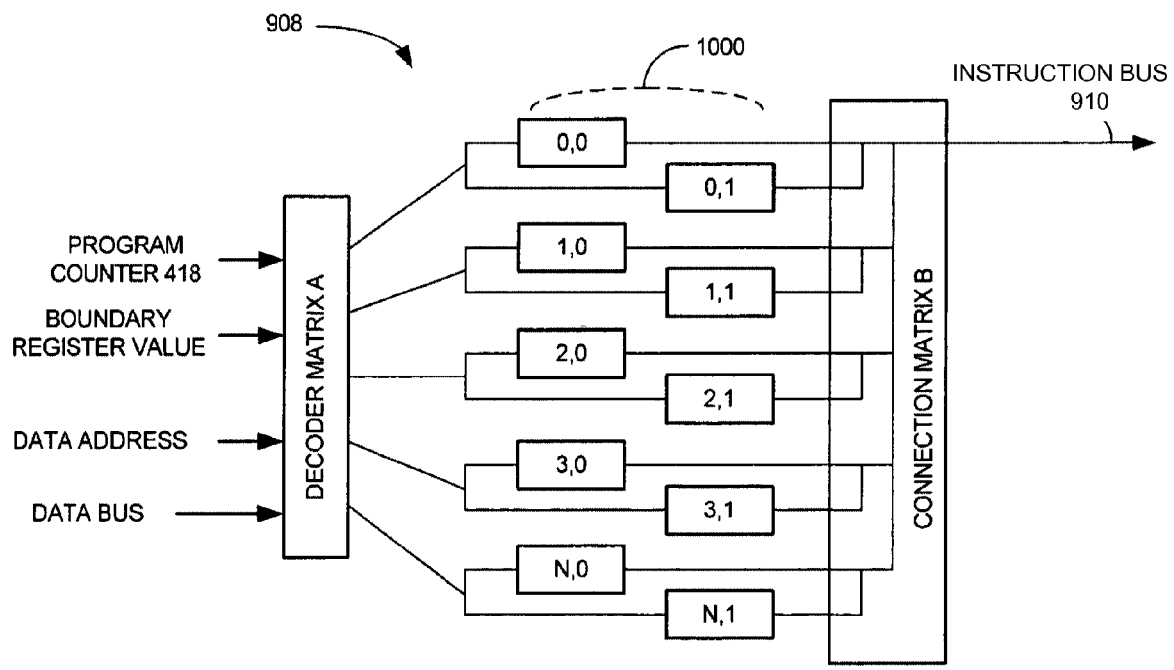
FIG. 10 is a block diagram of the elastic shared RAM array of FIG. 9 in accordance with one implementation of the invention.

FIG. 10 illustrates further details of elastic shared RAM array 908 according to one implementation. In this implementation, each of the individual RAM memories 1000 of elastic shared RAM array 908 is 8-bits wide and is configured for instruction access. As shown, pairs of RAM memories 1000 can be configured to store a 16-bit instruction. For example, RAM memory 1000 having address [0,0] can store the first (8) bits of an instruction and RAM memory 1000 having address [0,1] can store the second (8) bits of the instruction. Accordingly, decoder matrix A and connection matrix B selects proper control lines to generate 16-bit instruction outputs along instruction bus 910. The individual RAM memories 1000 can have a different size depending upon application requirements. For example, assuming that elastic shared RAM array 908 is (64) bytes in size, then the total additional program words (2 bytes) available to be stored within elastic shared RAM array 908 (in one implementation) is given by the following equation:

$$\text{Additional\_program\_RAM} = (N+1)*64, \quad (\text{e.q. 2})$$

where N represents the number of rows in the bi-dimensional array of elastic shared RAM array 908.

In one implementation, instructions are loaded into RAM memories 1000 through an external access bus (e.g., external RAM array direct access bus 416 of FIG. 4). The instructions can also be loaded into RAM memories 1000 using a bootloader in combination with a communication peripheral, such as a Universal Asynchronous Receiver/Transmitter (UART) or Serial Peripheral Interface (SPI).

Shared Usage as Program Memory and Data Memory

Figure 11:
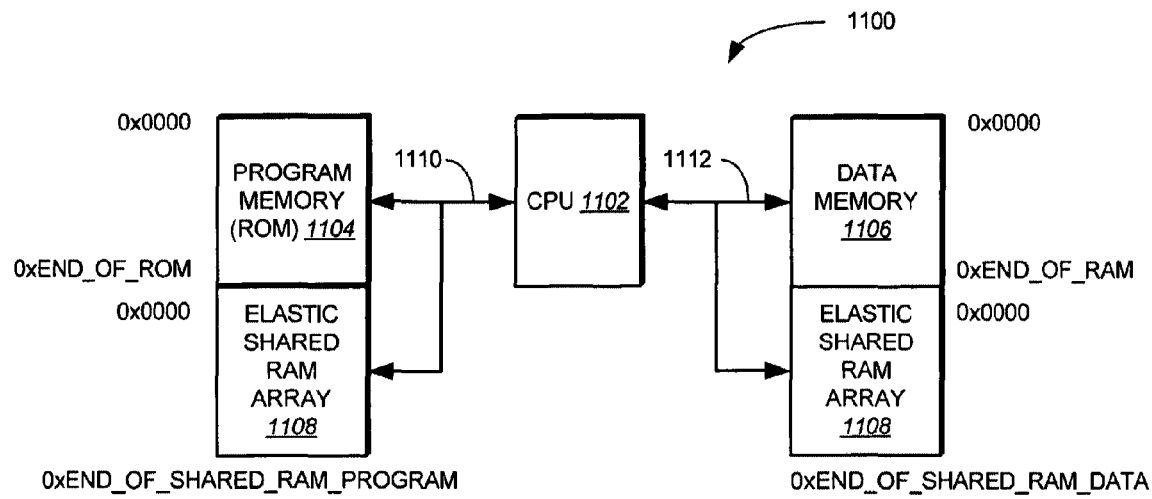
FIG. 11 is a block diagram of a microcontroller including an elastic shared RAM array in accordance with one implementation of the invention.

Referring to FIG. 11, a microcontroller 1100 is shown including a CPU 1102, a program memory 1104, a data memory 1106, and an elastic shared RAM array 1108. In the example of FIG. 11, elastic shared RAM array 1108 is configured to store both instructions and data (e.g., during normal use of an ASIC that incorporates microcontroller 1100 or during testing of code within program memory 1104). Accordingly, CPU 1102 is in communication with program memory 1104 and a first portion of elastic shared RAM array 1108 through instruction bus 1110, and is in communication with data memory 1106 and a second portion of elastic shared RAM array 1108 through data bus 1112.

In one implementation, in order to use the elastic shared RAM array 1108 as an extended program memory (to store instructions) and an extended data memory (to store data), a programmer can write a boundary register value into a boundary register (e.g., boundary register 410) that specifies the boundary between a data portion and an instruction portion of elastic shared RAM array 1108. For example, in one implementation, the boundary register can include a value 0×END_OF_SHARED_RAM_PROGRAM that designates the instruction portion of elastic shared RAM array 1108 to be used as an extended program memory to store only instructions. Thus, in one implementation, the program counter (e.g., program counter 418 of FIG. 4), can specify only those address values from, for example, 0×0000 to 0×END_OF_SHARED_RAM_PROGRAM from which instructions will be fetched from elastic shared RAM array 1108.

Figure 12:
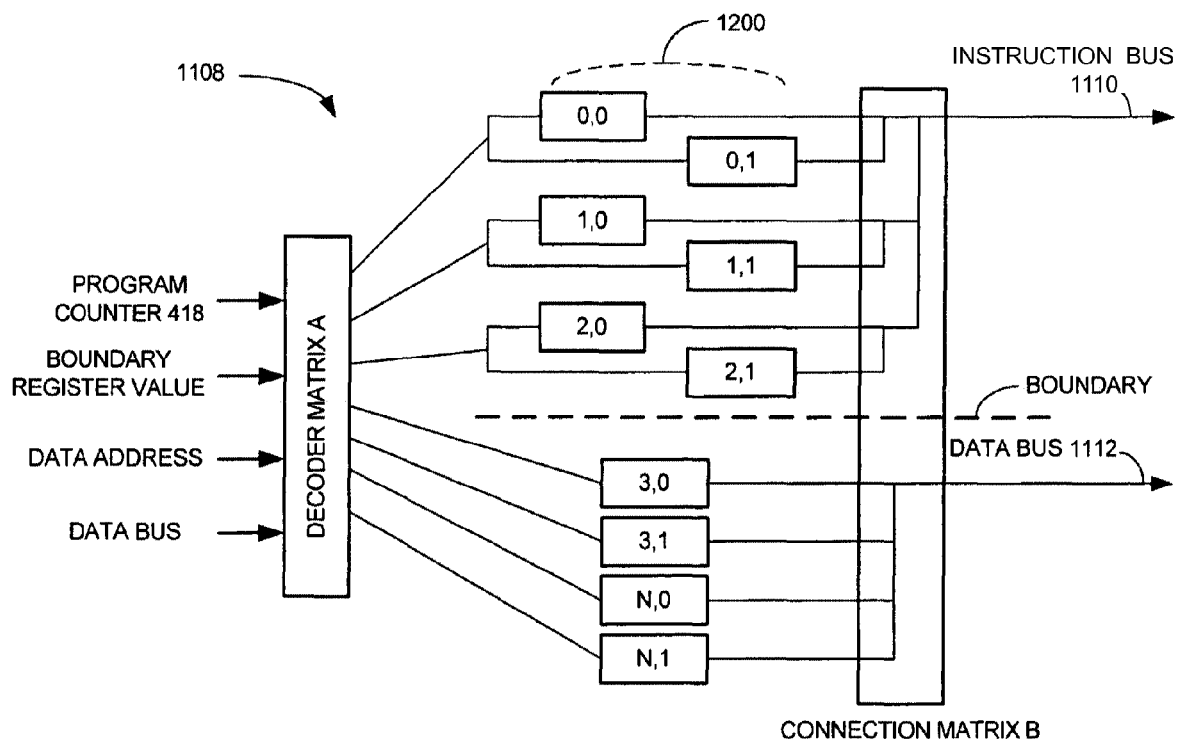
FIG. 12 is a block diagram of the elastic shared RAM array of FIG. 11 in accordance with one implementation of the invention.

FIG. 12 illustrates further details of elastic shared RAM array 1108 according to one implementation. In this implementation, each of the individual RAM memories 1200 of elastic shared RAM array 1108 is 8-bits wide and some are configured for instruction access and some are configured for data access. As shown, pairs of RAM memories 1200 can be configured to store a 16-bit instruction, while other individual RAM memories can be configured to store 8-bit data. In this implementation, CPU 1102 reads instructions from the upper RAM memories 1200 (i.e., above the boundary line) and read/writes data from the lower RAM memories 1200. Accordingly, decoder matrix A and connection matrix B selects proper control lines to generate 16-bit instructions for output along instruction bus 1110, and 8-bit data for output along data bus 1112. The individual RAM memories 1200 can have a different size depending upon application requirements.

Figure 13:
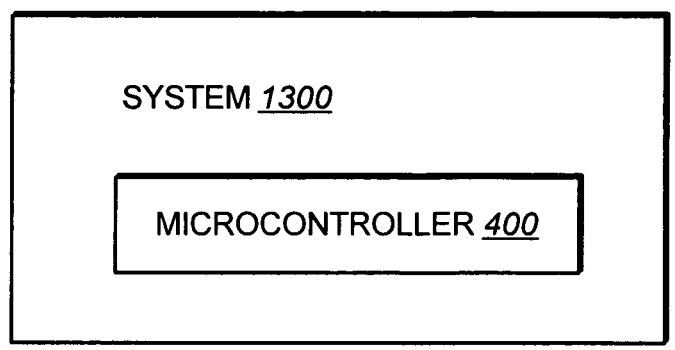
FIG. 13 illustrates a system including the microcontroller of FIG. 4 in accordance with one implementation of the invention.

FIG. 13 illustrates a system 1300 including a microcontroller in accordance with the present invention (e.g., microcontroller 400 of FIG. 4). System 1300 can be any type of system or ASIC. For example, system 1300 can be a data storage system, wireless system, or a computer system.

Various implementations of a microcontroller have been described. Nevertheless, one or ordinary skill in the art will readily recognize that there that various modifications may be made to the implementations, and any variation would be within the spirit and scope of the present invention. For example, though examples described above generally described a microcontroller in accordance with the Harvard architecture, the invention is also applicable to microcontrollers in accordance with the Von Neumann architecture. Accordingly, many modifications may be made by one of ordinary skill in the art without departing from the spirit and scope of the following claims.

What is claimed is:

1. A microcontroller comprising:
   a first memory configured to store instructions;
   a second memory configured to store data;
   a third memory including a contiguous first portion configured to store instructions and a contiguous second portion that is distinct from the first portion and configured to store data, wherein the first portion includes memory elements of a first width configured into one or more pairs to store instructions of a second width for output onto an instruction bus of the second width, and wherein the second portion includes memory elements of the first width configured to individually store data for output onto a data bus of the first width; and
   a central processing unit configured to execute instructions and process data, wherein the instructions are selected from the instructions stored in the first memory and the instructions stored in the first portion of the third memory, the data are selected from the data stored in the second memory and the data stored in the second portion of the third memory, wherein the central processing unit is coupled to the first memory and the first portion of the third memory via the instruction bus, and the central processing unit is coupled to the second memory and the second portion of the third memory via the data bus that is separate from the instruction bus.

2. The microcontroller of claim 1, wherein the first memory comprises a read-only memory and the second and third memories comprise read/write memories.

3. The microcontroller of claim 1, wherein the third memory is configured to be accessible external to the microcontroller using an external direct access bus that is coupled to the third memory.

4. The microcontroller of claim 1, comprising:
   a register configured to store a memory address based on which the third memory is divided into the first portion and the second portion.

5. The microcontroller of claim 4, wherein a size of the first portion and a size of the second portion can be varied by changing the memory address stored in the register.

6. A method comprising:
   receiving, in a debugging mode of operation of a microcontroller, a patch code instruction from a memory associated with the microcontroller via an instruction bus;
   executing the patch code instruction during the debugging mode of operation of the microcontroller;
   dividing the memory during a normal mode of operation of the microcontroller into a contiguous first portion for storing instructions and a contiguous second portion that is distinct from the first portion for storing data, wherein the memory is demarcated based on reading a memory address stored in a register for specifying a boundary between the first portion and the second portion;
   configuring the first portion of the memory for storing instructions and the second portion of the memory for storing data, wherein the first portion includes memory elements of a first width configured into one or more pairs to store instructions of a second width for output onto the instruction bus that is of the second width, and wherein the second portion includes memory elements of the first width configured to individually store data for output onto a data bus of the first width;
   storing instructions in the first portion of the memory and data in the second portion of the memory;
   receiving, during the normal mode of operation of the microcontroller, a second instruction from the first portion of the memory via the instruction bus in response to a first selection using a connection matrix associated with the memory;
   receiving, during the normal mode of operation of the microcontroller, data from the second portion of the memory via the data bus that is separate from the instruction bus in response to a second selection using the connection matrix;
   executing the second instruction; and
   processing at least a portion of the data received via the data bus.

7. The method of claim 6, comprising:
   receiving, during the normal mode of operation of the microcontroller, additional instructions from an additional instruction memory of the microcontroller via the instruction bus; and
   executing the additional instructions.

8. The method of claim 6, comprising:
   receiving, during the normal mode of operation of the microcontroller, additional data from an additional data memory of the microcontroller via the data bus; and
   processing the additional data.

9. A microcontroller comprising;
   a first memory configured to store first instructions;
   a second memory configured to store first data;
   a third memory configured to store patch code instructions in a debugging mode of operation of the microcontroller, and configured to be divided, during a normal operation mode of the microcontroller, into a contiguous first portion configured for storing second instructions and a contiguous second portion that is distinct from the first portion configured for storing second data, wherein the first portion includes memory elements of a first width configured into one or more pairs to store second instructions of a second width for output onto an instruction bus of the second width, and wherein the second portion includes memory elements of the first width configured to individually store second data for output onto a data bus of the first width;
   a register configured to store a memory address specifying a boundary between the first portion and the second portion such that the third memory is divided into the first portion and the second portion based on the memory address;

a central processing unit configured to execute the first instructions and the patch code instructions when in the debugging mode, and configured to execute the first instructions and the second instructions and process the first data and the second data when in the normal operation mode, the central processing unit coupled to the first memory and the first portion of the third memory via the instruction bus, and coupled to the second memory and the second portion of the third memory via the data bus that is separate from the instruction bus; and a matrix coupled to the third memory and configured to selectively provide the second instructions to the instruction bus and the second data to the data bus from the third memory.

10. The microcontroller of claim 9, wherein the first memory is a read-only memory and the third memory is a bi-dimensional random access memory (RAM) array.

11. The microcontroller of claim 10, wherein the memory elements included in the third memory comprises a plurality of RAMs.

12. The microcontroller of claim 11, wherein the first width is 8 bits and the second width is 16 bits, and wherein a subset of the plurality of RAMs is configured to store second instructions that are 16-bit wide, and another subset of the plurality of RAMs is simultaneously configured to store second data that are 8-bit wide.

13. The microcontroller of claim 9, wherein the central processing unit is configured to process the first data and the second data in the normal operation mode.

14. The microcontroller of claim 9, wherein the first width is 8 bits and the second width is 16 bits, and wherein the instruction bus is configured to operate as a 16-bit instruction bus and the data bus is configured to operate as an 8-bit data bus.

15. The microcontroller of claim 9, wherein a size of the first portion and a size of the second portion can be varied by changing the memory address stored in the register.

16. A microcontroller comprising:
a first memory configured to store instructions;
a second memory configured to store instructions during a debugging mode of operation of the microcontroller, and configured to be divided into a contiguous first portion and a contiguous second portion that is distinct from the first portion during a normal operation mode of the microcontroller, the first portion includes memory elements of a first width configured into one or more pairs for storing instructions of a second width while the second portion includes memory elements of the first width configured for individually storing data of the first width, wherein the division of the second memory into the first portion and the second portion is based on a memory address stored in a register for specifying a boundary between the first portion and the second portion;
a processing unit coupled to the first memory via a first bus and coupled to the second memory via the first bus and a second bus that is distinct from the first bus; and
a third memory configured to store data and coupled to the processing unit via the second bus, the third memory being further coupled to the second memory via a connection that is distinct from the first bus.

17. The microcontroller of claim 16, wherein the connection includes a multiplexer that is directly coupled to the second memory using the second bus.

18. The microcontroller of claim 16, wherein the first bus includes an instruction bus and the second bus includes a data bus and wherein the instruction bus is of the second width while the data bus is of the first width.

19. The microcontroller of claim 16, further comprising a multiplexer to selectively provide instructions from the first memory and the second memory to the processing unit.

20. The microcontroller of claim 16, further comprising a third bus coupled to the second memory to provide a direct access to the second memory via the third bus, wherein the direct access is external to the microcontroller.

21. The microcontroller of claim 16, wherein a size of the first portion and a size of the second portion can be varied by changing the memory address stored in the register.

* * * * *